United States Patent [19]

Smith

[11] Patent Number: 4,474,552

[45] Date of Patent: Oct. 2, 1984

[54] INFRA-RED COMBINATIONS

[76] Inventor: Thomas M. Smith, 1415 Gold Rd., Cinnaminson, N.J. 08077

[21] Appl. No.: 292,167

[22] Filed: Aug. 12, 1981

Related U.S. Application Data

[63] Continuation-in-part of Ser. No. 279,081, Jun. 30, 1981, Pat. No. 4,416,618, Ser. No. 238,418, Feb. 26, 1981, , Ser. No. 186,491, Sep. 12, 1980, Pat. No. 4,378,207, Ser. No. 179,121, Aug. 14, 1980, Pat. No. 4,373,904, Ser. No. 20,079, Mar. 13, 1979, Pat. No. 4,290,746, and Ser. No. 952,332, Oct. 18, 1978, Pat. No. 4,326,843, said Ser. No. 238,418, and Ser. No. 186,491, each is a continuation-in-part of Ser. No. 94,901, Nov. 16, 1979, Pat. No. 4,272,238, and Ser. No. 775,838, Mar. 9, 1977, Pat. No. 4,272,237, said Ser. No. 186,491, Ser. No. 178,121, and Ser. No. 20,079, each , said Ser. No. 863,251, and Ser. No. 178,121, said Ser. No. 94,901, Ser. No. 20,079, and Ser. No. 952,332, each is a continuation-in-part of Ser. No. 906,229, May 15, 1978, Pat. No. 4,157,155, said Ser. No. 94,901, and Ser. No. 906,229, each is a continuation-in-part of Ser. No. 863,251, , , and Ser. No. 775,838, , , said Ser. No. 20,079, Ser. No. 952,332, and Ser. No. 863,251, each is a continuation-in-part of Ser. No. 775,838.

[51] Int. Cl.³ ............................................. F23D 13/12
[52] U.S. Cl. .................................... 431/328; 266/103; 432/8; 432/59; 432/175; 432/266
[58] Field of Search ...................... 431/264, 328, 329; 266/102, 103, 106, 110; 432/8, 31, 59, 226, 175; 126/92 AC; 148/156

[56] References Cited

U.S. PATENT DOCUMENTS

| 1,948,173 | 2/1934 | Hagan | 432/8 |
|---|---|---|---|
| 3,086,763 | 4/1963 | Ruff et al. | |
| 3,087,041 | 6/1963 | Vonk | 431/328 |
| 3,237,679 | 3/1966 | Best | 431/329 |
| 3,744,963 | 7/1973 | Flynn | 432/59 |
| 3,947,229 | 3/1976 | Richter | 431/328 |
| 4,202,661 | 5/1980 | Lazaridis et al. | 266/103 |
| 4,235,591 | 11/1980 | Aebli | 432/59 |

FOREIGN PATENT DOCUMENTS

| 763402 | 12/1956 | United Kingdom | 431/328 |
|---|---|---|---|
| 963667 | 7/1964 | United Kingdom | 432/59 |

Primary Examiner—Samuel Scott
Assistant Examiner—Noah Kamen
Attorney, Agent, or Firm—Connolly and Hutz

[57] ABSTRACT

Infra-red irradiation is combined with additional heating and/or drying to more effectively treat substrates. Irradiation from gas-fired infra-red radiators provides hot gaseous combustion products that can be directed to help heat and/or dry substrates. Width of irradiator can be made adjustable, as can its color temperature. Color temperatures as low as 950° F. can be obtained without combustion catalysts such as platinum, by having a fine-mesh wire screen in front of ceramic fiber matrix burner face.

3 Claims, 18 Drawing Figures

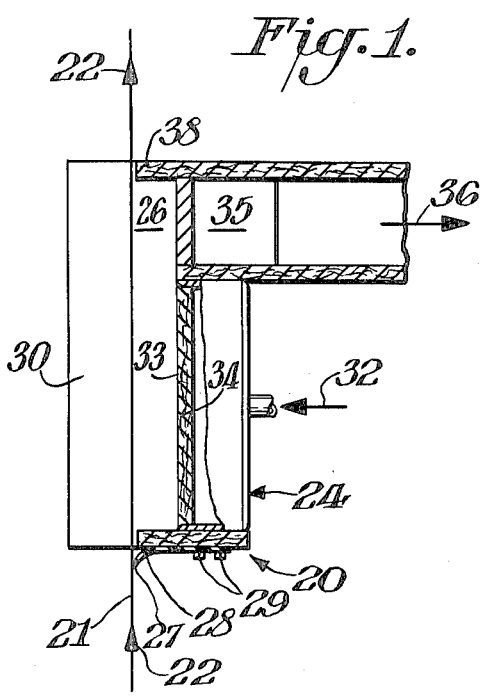
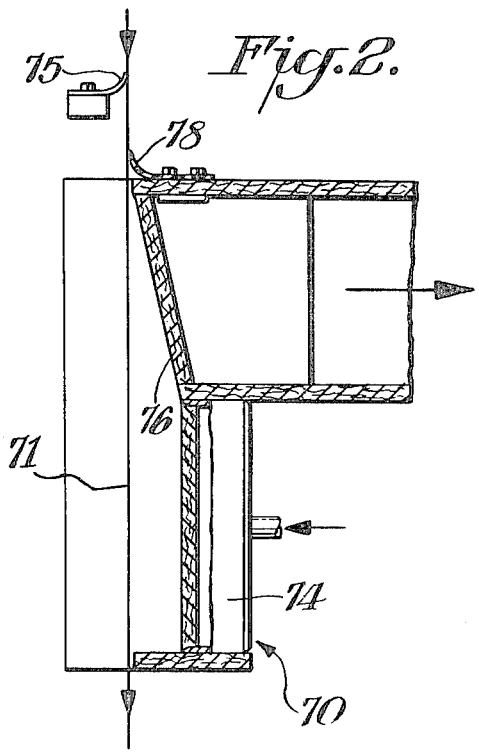
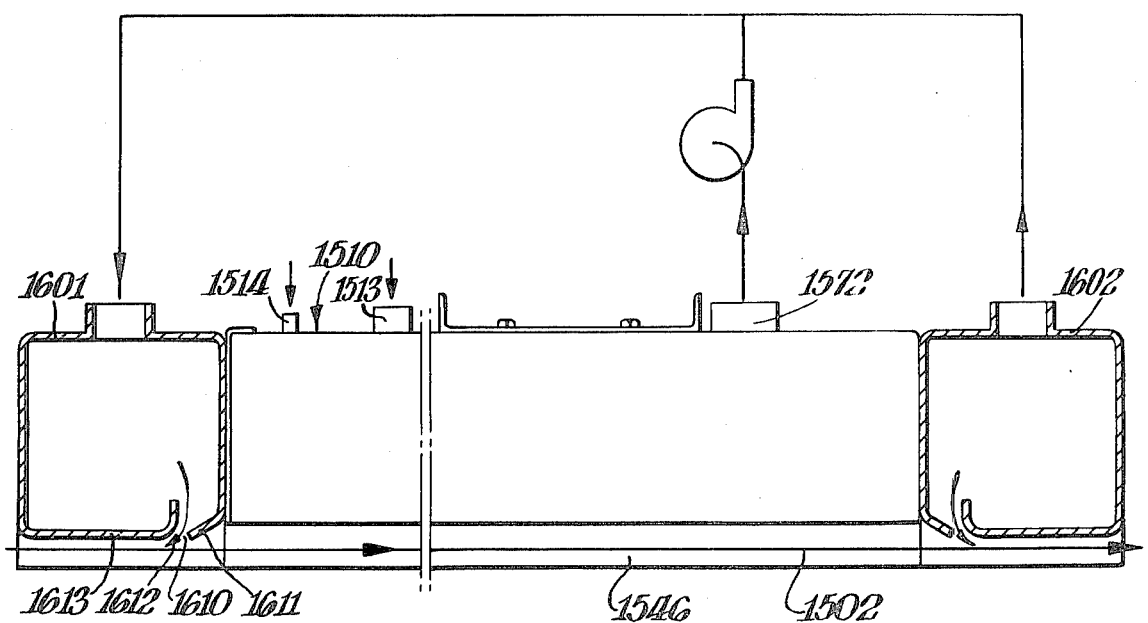

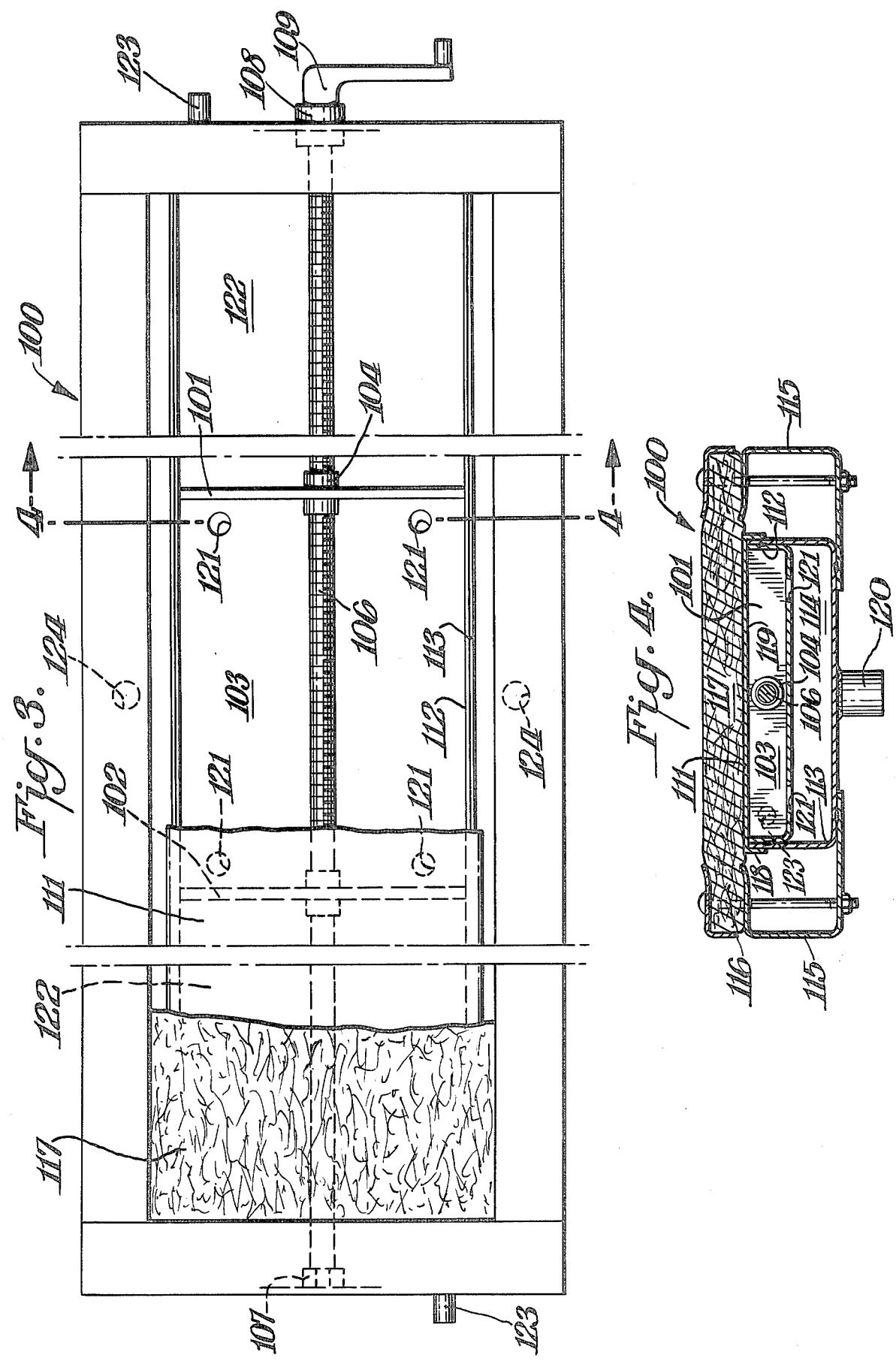

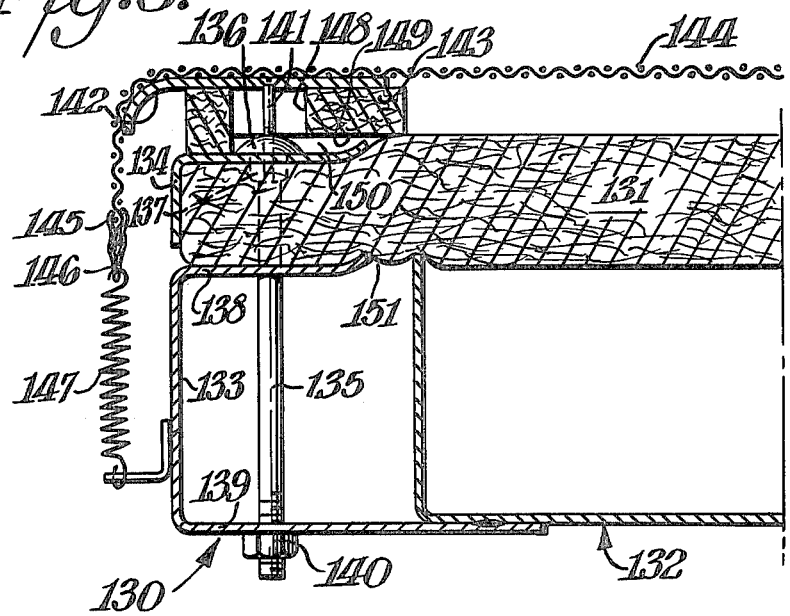
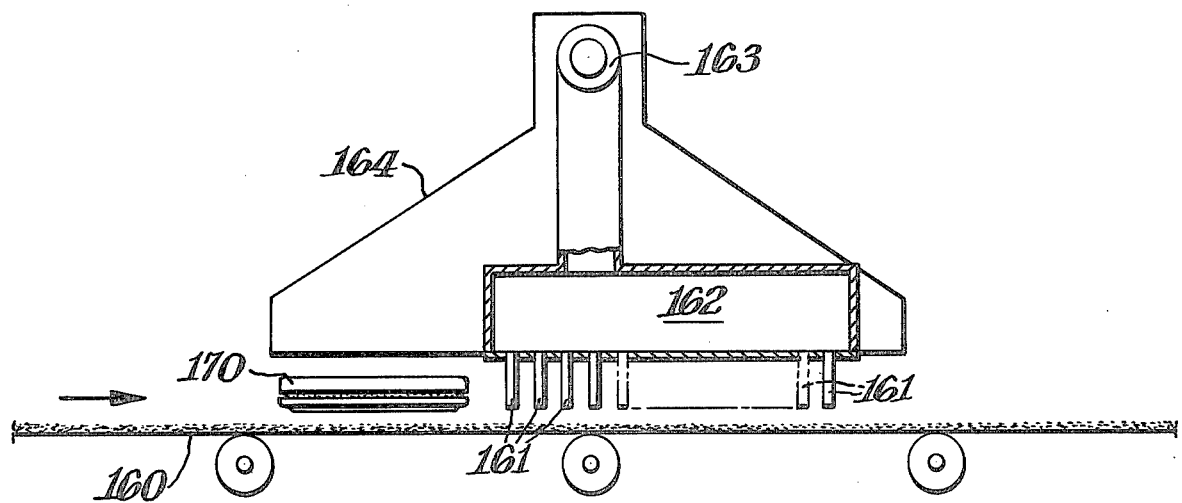

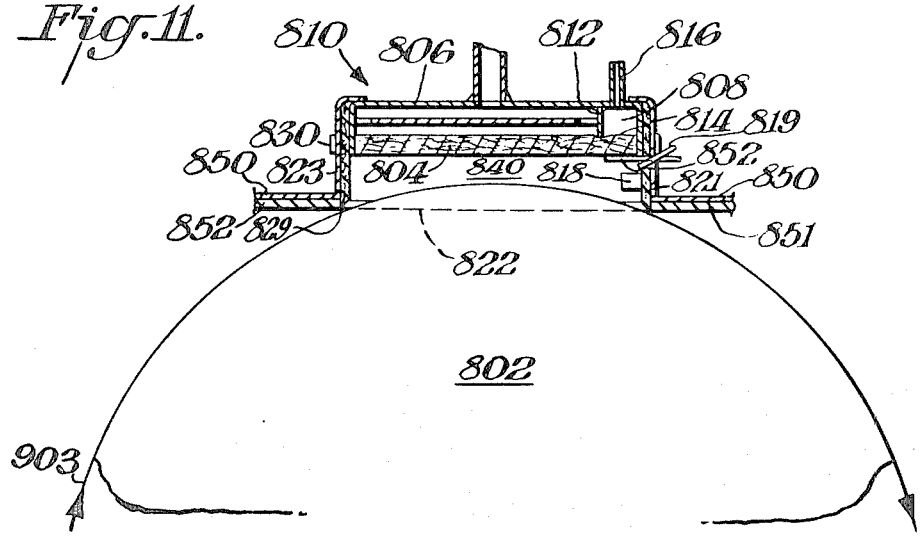
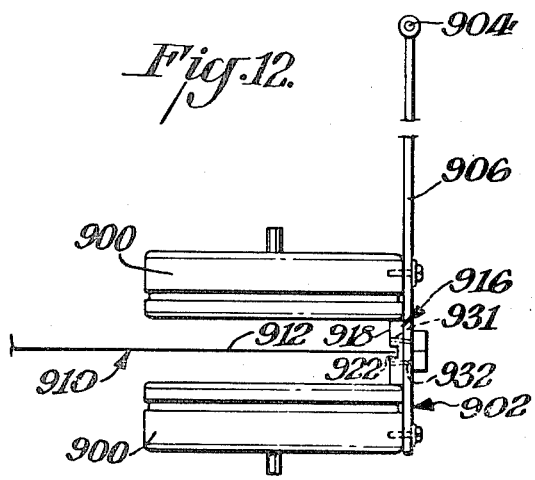
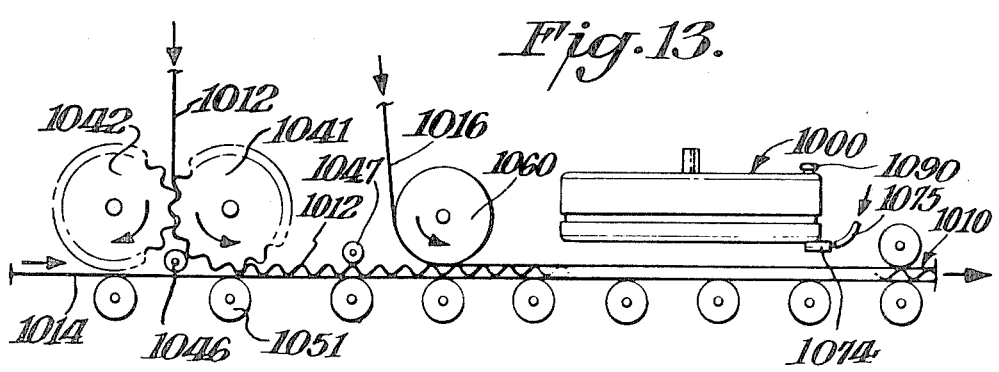

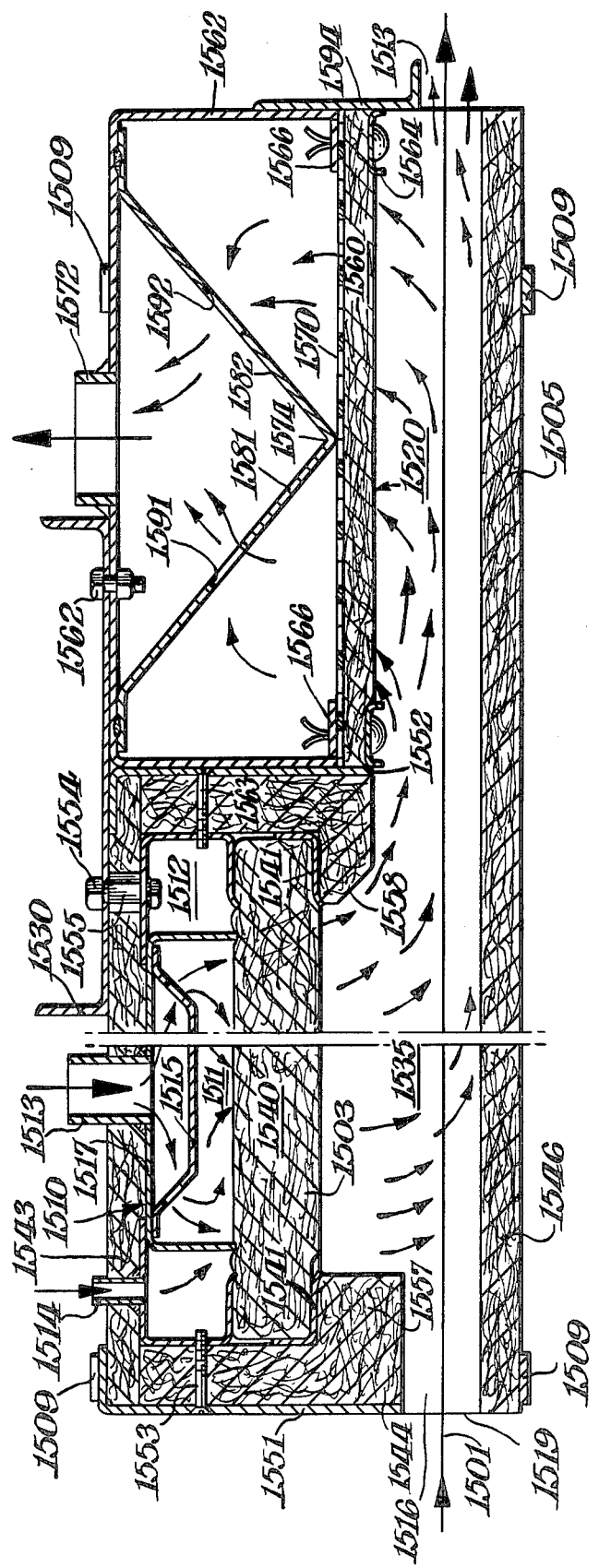

INFRA-RED COMBINATIONS

This application is a continuation-in-part of applications Ser. No. 279,081 filed June 30, 1981, now U.S. Pat. No. 4,416,618, Ser. No. 238,418 filed Feb. 26, 1981, Ser. No. 186,491 filed Sept. 12, 1980 (now U.S. Pat. No. 4,378,207 granted Mar. 29, 1983), Ser. No. 178,121 filed Aug. 14, 1980 (now U.S. Pat. No. 4,373,904 granted Feb. 15, 1983), Ser. No. 20,079 filed Mar. 13, 1979 (now U.S. Pat. No. 4,290,746 granted Sept. 22, 1981), and Ser. No. 952,332 filed Oct. 18, 1978 (now U.S. Pat. No. 4,326,843 granted Apr. 27, 1982). In turn, Ser. No. 238,418, Ser. No. 186,491 and Ser. No. 178,121 are each continuations-in-part of Ser. No. 94,901 filed Nov. 16, 1979 (now U.S. Pat. No. 4,272,238 granted June 9, 1981) and of Ser. No. 775,838 filed Mar. 9, 1977 (now U.S. Pat. No. 4,272,237 granted June 9, 1981); while Ser. No. 186,491, Ser. No. 178,121 and Ser. No. 20,079 are each continuations-in-part of Ser. No. 863,251 filed Dec. 22, 1977 (now U.S. Pat. No. 4,224,018 granted Sept. 23, 1980); and Ser. No. 178,121, Ser. No. 94,901, Ser. No. 20,079 and Ser. No. 952,332 are each continuations-in-part of Ser. No. 906,229 filed May 15, 1978 (now U.S. Pat. No. 4,157,155 granted June 5, 1979). Ser. No. 94,901 and Ser. No. 906,229 are each also continuations-in-part of Ser. No. 863,251 and of Ser. No. 775,838; and Ser. No. 20,079, Ser. No. 952,332 and Ser. No. 863,251 are each continuations-in-part of Ser. No. 775,838.

The present invention relates to the infra-red irradiation of substrates such as webs of textile, paper, or the like, and even particles and people.

Among the objects of the present invention is the provision of techniques and equipment for effecting infra-red irradiation with improved results.

The foregoing as well as still further objects of the present invention are set out in the following description of several of its exemplifications, reference being made to the accompanying drawings wherein:

FIG. 1 is a vertical sectional view, partly broken away, of the key features of an arrangement for infra-red irradiation of a moving paper web pursuant to the present invention;

FIG. 2 is a view similar to that of FIG. 1 of a modified arrangement for such irradiation;

FIG. 3 is a plan view, with portions broken away, of an infra-red generator with an adjustable width according to the present invention;

FIG. 4 is a sectional view taken along line 4—4, of the infra-red generator of FIG. 3;

FIG. 5 is a sectional view similar to that of FIG. 4, showing a modified infra-red generator representative of the present invention;

FIG. 8 is a sectional side view of yet another irradiating arrangement pursuant to the present invention;

FIG. 10 is a vertical sectional view of further modified infra-red radiators of the present invention;

FIGS. 11, 12, 13 and 14, are somewhat schematic side views of still other irradiating arrangements of the present invention;

FIG. 18 is a sectional view of a still further embodiment of the present invention.

Figure 6:
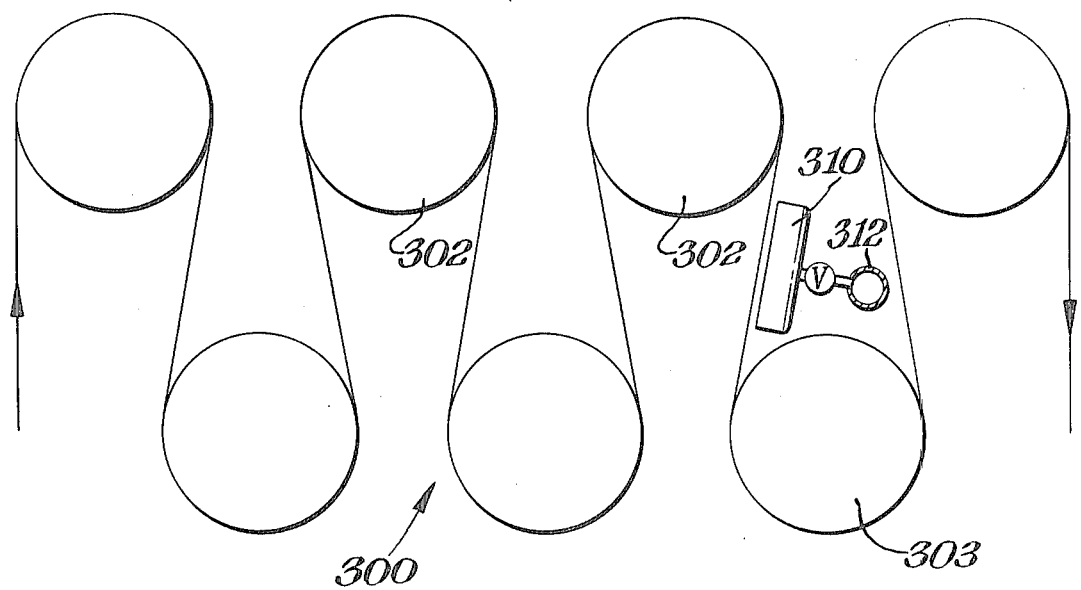
FIG. 6 is a schematic side view of a further modification of an infra-red irradiation treatment representative of the present invention.

The heating of webs of paper, textile or the like, to dry them for example, is an awkward commercial operation, particularly where the webs to be heated are moving at the usual production speeds which can range up to several thousand feet per minute. Over the years the art had adopted the use of long hot air ovens, or tenter frames or a series of steam-heated rolls over which the web is carried and against which it is heated by contact.

In the drying of paper manufactured on a Fourdrinier type machine, a single paper production line drier can have scores of steam rolls, each supplied with steam generated an appreciable distance from the rolls. Each steam roll is a very expensive investment and the generation and transportation of the steam involves substantial thermal inefficiencies, even when the steam is generated with a low-cost fuel.

The use of infra-red irradiation to help dry moving webs has been tried in limited ways and has been found desirable, particularly with respect to thermal efficiency.

The present invention supplies infra-red radiation techniques with particularly high thermal efficiency and low capital cost, for drying or heating webs or other articles.

Turning now to FIG. 1, there is here shown a drying station 20 for a wet paper web 21. The web is moving upwardly, in the direction of the arrows 22, past the drying station. The station includes an infra-red generating gas burner 24, a re-radiator 26 of infra-red energy, a scoop means 28, and side walls 30.

Scoop means 28 is a metal or plastic plate extending the width of web 21 and shown secured at one end to a body of the burner by bolts 29. The scoop is so arranged that its other end 27 is bent with a gradual curvature to point toward the direction from which the web is approaching and to come within about 1 millimeter of the paper surface. No spacing is actually needed between the scoop end 27 and the paper surface, and the less the spacing the better. The scoop end can even touch the paper, but care should then be taken that the scoop is not worn away too rapidly by such frictional engagement.

After the web passes the scoop, it is exposed to the direct radiation of generator 24. This generator can be constructed as described in FIG. 9 of parent U.S. Pat. No. 4,272,238 or FIG. 18 of parent application Ser. No. 238,418, and the entire contents of both the patent and the application are included in the present application as though fully set forth herein. Gaseous combustion mixture is fed to the burner and is represented by the arrow 32.

This mixture burns at the outer face 33 of a fibrous ceramic matrix 34 and that face is heated by the combustion to a temperature of from about 1100° to about 1600° F., depending upon the rate at which combustion mixture is supplied.

Matrix 34 preferably is a felted ceramic fiber mat as described in the parent applications. Particularly desirable are such mats that are stiffened by starch and finely divided clay. Although starch decomposes at temperatures much lower than 1100° F., such decomposition does not extend deeply into the matrix, and forms a carbonaceous layer that may help keep the infra-red radiation from backward penetration any deeper into the matrix. The flow of combustion mixture in the forward direction through the matrix keeps the matrix below the starch-decomposing temperature at distances as small as about 1 to 2 millimeters from the incandescence.

After passing the burner 24, the paper web 21 passes in front of a re-radiator panel 26 in which can be a porous ceramic fiber mat just like matrix 34 or a felted or needled more flexible blanket of ceramic fibers. The hot gaseous combustion products of burner 24 rise, flow over the face of panel 26, and move through the pores of the panel into a discharge plenum 35 from which they then are discharged as shown by arrow 36. To help with such movement a blower can be inserted in the discharge conduit to suck the gaseous combustion products through panel 26. This suction need be no greater than that which assures the flow of all the hot combustion products through panel 26 with no substantial dilution as by ambient air drawn in from around the heating station. To minimize such dilution, the station includes a barrier 38 that reaches close to the adjacent surface of web 21 and side walls 30 extend past the side edges of the web. Barrier 38, walls 30, the discharge plenum and the associated structure can all be fibrous or non-fibrous ceramic mats. Power exhausting through panel 26 provides better control and substantially improves the heat exchange efficiency by minimizing the boundary layer effect present when the hot gaseous combustion products merely flow past the face of the panel.

The continuous contacting of the outer face of panel 26 with these hot gases causes that face to heat up to temperatures close to the temperature of those gases, generally only a few hundred degrees F. below the temperature of matrix face 33. The outer face of panel 26 accordingly becomes an effective re-radiator of infra-red energy and thus adds to the thermal efficiency of the station. In general, unless the re-radiating surface area is at least about one-fourth the surface area of incandescent face 33, the added efficiency might not be worth the extra construction, although even a one-inch height of panel 27 provides a measurable increase in the heating effect.

The gaseous combustion products withdrawn at 36 can be led to a different station where they can be used, as a space heater for example, or to help heat a pulp digester or the like. These combustion products have an unusually low content of carbon monoxide and nitrogen oxides, so that they are not significant health hazards. If desired these combustion products can be diluted with ambient air sucked in through the walls of discharge plenum 35 or the walls of the discharge conduit, downstream of panel 26, so as to avoid cooling that panel. Thus the ceramic walls of that plenum or conduit can be made porous in those locations.

If the web being irradiated contains a resin or other material which on drying gives off decomposition products or other contaminants, the draw-off suction applied to discharge plenum 35 can be limited so as to keep from drawing off all the gaseous material between web 21 and the front of panel 26. The gases not sucked away are then carried off by the moving web and vented through the gap 40 between barrier 38 and the web. These vented gases can be exhausted through a separate exhaust system, if desired, and used where any contaminant content will not be harmful.

Minimizing the contaminant content in the gases sucked through panel 26, minimizes the danger of having the pores in that panel plugged by contaminants, and also provides a draw-off stream of hot relatively pure combustion products that can be used to heat other materials without significantly contaminating them.

By way of example, only about 60 to 80% of the hot gases between web 21 and panel 26 can be sucked through that panel.

A feature of the FIG. 1 apparatus, is that if, as sometimes happens, there is a tear in the paper web 21 and the torn leading edge curls toward the burner side of the paper, that curl will be engaged and deflected by the scoop 28 so that it does not reach the incandescent face 33 and does not become ignited.

When paper is sufficiently dry, it will ignite if exposed too long to the incandescent face 33, even when that face is at the relatively low temperature of 1100° F. To prevent ignition from such over-exposure, the web-moving equipment is connected to shut off the combustion mixture feed to the burner or the feed of fuel gas to the combustion mixture, when the speed is reduced below one foot per second or thereabouts. Somewhat lower speeds can be tolerated at the wet end of a paper dryer.

Electric ignition is highly desirable for the burner 24, inasmuch as no pilot light is then necessary and the incandescent face 33 can be kept fairly close to the paper web. A four-inch or less spacing from the web makes a very desirable arrangement, and to this end the electric ignition of U.S. Pat. No. 4,157,155 is particularly suitable. However, a pilot flame can be used instead of electric ignition, even with a two-inch spacing between the web and face 33, if the pilot flame is of relatively short length and provided as in the construction of FIG. 22 of Ser. No. 238,418, using a gas-air mixture to produce a blast-like flame.

The entire heating unit 20 can be made retractible so that it can withdraw from close engagement with web 21, as for example to thread a torn leading edge of the web past the heating station and to permit lighting of the burner's pilot light where one is used.

FIG. 2 shows a modified drying station 70 having two scoop plates 78 and 75 in close juxtaposition to a web 71 which in this case is moving downwardly. The burner 74 of this station can be the same as burner 24 of FIG. 1, but re-radiator plate 76 of FIG. 2 is inclined so that its upper end is very close to web 71, and it also has an outer face with about the same surface area as the incandescent burner face.

The inclination of plate 76 causes the hot gaseous combustion products to come into very close contact with the web as these gaseous products rise, and thus transfer some of their heat to the web by conduction. This conduction heating is in addition to the re-radiation that is also produced at the outer face of panel 76.

Any or all of the scoops of FIGS. 1 and 2 can be replaced by a pair of pinch rollers that engage both faces of the paper web, or an idler roller that engages the face to be irradiated at the heating station. Rollers are not as desirable as scoops, but they will keep boundary layer moist air from remaining in contact with the sheet as it is being irradiated.

Burners 24 and 74 are illustrated as of the non-air-seal matrix type, but air-seal matrix burners as in FIG. 8 of U.S. Pat. No. 4,272,238 can be used in their place.

Other types of gas-fired infra-red generators can be used in place of burners 24 or 74, but the ceramic fiber matrix burner is superior not only because of its greater efficiency in generating infra-red energy, but also because shutting off the flow of combustion mixture causes an incandescent matrix surface to cool in about 5 seconds or less to the point that it will not feel hot when touched with a bare hand. Even quicker cool-downs can be arranged by merely shutting off the flow of fuel gas, but maintaining the flow of the air used for the combustion.

The burner 100 of FIGS. 3 and 4 has a pair of partitions 101,102, movable along a combustion mixture plenum 103 that extends from one end of the burner to the other. As shown, the partitions are equipped with internally threaded screw followers 104 through which penetrate a threaded adjusting rod 106 pivotally received in bearings 107, 108 at the burner ends. The ends of rod 106 are threaded in opposite directions so that rotating the rod as by means of handle 109 at one end, will move both partitions toward or away from each other.

Combustion mixture plenum 103 is the space within a shallow metal trough 110, and a porous metal plate 111 overlying the trough. The trough has its side walls 112 welded to a deep metal channel 113 so as to provide a spacing 114 between the floor of the trough and the floor of the channel. A spacing of about 1 inch makes the burner body sufficiently rigid and resistant to thermal warpage, even when the channel is made of 59 mil thick stainless steel sheet and the trough of the same thickness cold rolled steel.

Air-seal channels 115 are shown welded to the floor of channel 113 to provide air-seal plenums and to support the sides 116 of the ceramic fiber matrix 117. Plate 111 can be made of porous sintered iron, steel or copper, or of ordinary steel perforated with closely spaced apertures each less than about $\frac{1}{4}$ inch wide, and can have side edges 118 bent downwardly to overhang the side walls of channel 113 and thus hold itself in proper position. Plate 111 can be welded to those side walls to further stiffen the burner body, if desired, in which event overhangs 118 can be made shorter or completely eliminated.

The lower surface 119 of plate 111 should be relatively smooth, at least where it is engaged by partitions 101, 102, so as to keep from frictionally damaging the partitions as they are slidably adjusted in trough 110. Plate 111 is also preferably sufficiently rigid to keep from sagging between its supported edges. The floor of trough 110 should likewise not sag.

Combustion mixture is shown as supplied through a nipple 120 opening into the center of the floor of channel 113. This mixture flows through spacing 114 and then through holes 121 in the floor of trough 110. These holes are located in a section of the trough which is not reachable by the movable partitions. Those partitions are preferably plates of rigid poly(tetrafluoroethylene) or polyethylene closely fitted in the plenum 103 so as to do a good job of keeping the combustion mixture from the trough spaces 122 on the outside of the partitions. Spaces 122 are supplied with air through connecting nipples 123 and the pressure of that air in spaces 122 is maintained about the same as the pressure in combustion mixture plenum 103 to minimize leakage of the combustion mixture past the partitions. Both the combustion mixture in plenum 103 and the air in spaces 122 flow fairly readily through the porous plate 111 and matrix 117, and this flushes out any leakage across the partitions in either direction so that there is no build-up of trans-partition leakage. The threaded connection with adjusting rod 106 accordingly does not have to be absolutely gas-tight. The use of Acme thread helps fit the threaded parts with minimum clearance, and a viscous grease lubricant helps further reduce or completely eliminate that clearance.

Air-seal air is shown as supplied to the air-seal plenums in longitudinal channels 115, by means of connecting nipples 124. There is no need for similar air-seal channels at the ends of the burner, inasmuch as the partitions 101, 102 provide such air-seals. However, if the partitions are permitted to move to the very ends of the burner body, air-seal channels can be provided at those ends.

Instead of using a single adjusting rod 106, two such rods can be arranged side-by-side and spaced from each other, but geared together with correspondingly spaced thread followers 104 on the partitions. This modification helps assure that the partitions do not cock over when they are being adjusted. In the event the adjusting rod 106 needs additional support, such a support can be fitted in the center of plenum 103.

Where the combustion mixture and/or air are supplied from sources at pressures significantly above those maintained in plenum 103 and spaces 122 respectively, with valve restrictions to adjust the respective pressure drops, the valves are reset to adjust those pressures when the partitions are moved. Moving them apart increases the outflow of combustion mixture and reduces the outflow of air so that the effect of such valving is to change the pressures in plenum 103 and spaces 122. These valves can also be automatically adjusting valves connected to maintain their downstream pressures.

The burner of FIGS. 3 and 4 can be used to irradiate substrates of varying widths, without wasting irradiation from the extreme ends of the burner where those ends project beyond the substrate. When used with the auxiliary drying structure of FIG. 1 or FIG. 2, it is helpful to make the sidewalls of that auxiliary structure adjustable like the burner partitions 101, 102.

The varying burner widths can alternatively be provided with stationary partitions located at each edge of each substrate width. Such partitions can be made of thin sheet metal welded in place, so that they create plenum compartments each separately supplied with combustion mixture. Each supply can be with separate air and gas streams, and the gas supply arranged to be separately shut off when the supplied compartment is not to be used for irradiation. This leaves the air still flowing through that compartment when it is not irradiating, and thus maintains combustion mixture in the adjacent compartment sharply defined as it emerges from the matrix.

A series of such separate plenum compartments can be provided at each end of the burner and each compartment can be as little as 1 or 2 inches wide although they can be as wide as desired. The compartments do not have to be used, or even installed, in symmetrical arrangements.

The use of air-seals at each edge of the burner matrix protects those edges from damage by burn back of the combustion mixture due to relative stagnant flow in those locations. The burner construction of FIG. 18 of Ser. No. 238,418 has no such stagnant flow and its matrix edge attachments are protected by the thermal conductivity of relatively thick metal, so that such construction can be substituted for the air-seal construction.

The thermal efficiency of either type of burner is improved by pre-heating the air and/or gas supplied to the combustion mixture. Thus raising the temperature of the incoming combustion mixture from 70° F. to 100° or 120° F., enables a noticeable reduction in the amount of gas needed to maintain any radiation temperature at the matrix surface at which that mixture burns. So long as the ignition temperature of the gas is not reached, further increases in the temperature of the combustion mixture make for even further fuel saving. However, the matrix, which ordinarily has a practically endless useful life, tends to have its life shortened when the combustion mixture is supplied at temperatures over about 160° F. and the hot matrix surface is operated at 1500° F. or higher. For matrix operation at lower temperatures the incoming combustion mixture can be as hot as 250° F.

The burners generate very large quantities of hot combustion gases when they are in operation, so that it is a relatively simple matter to route the combustion mixture supply conduits in the path through which those hot gases rise away from the burner and cause some heating by those hot gases. It will be noted however that in many cases the burner body itself tends to become heated by those hot gases, particularly if the burner is firing face down, so that the combustion gases fed to the burner are heated by the burner body before they reach the matrix. It is the combustion engine mixture temperature when it reaches the matrix that is the critical temperature.

The efficiency of ceramic matrix burners is also increased by roughing the matrix surface on which combustion takes place, to cause some of the ceramic fibers to project out about 1 to 3 millimeters from the general plane of the surface. When a burner is operating properly, the outer face of its matrix is incandescent but there is also a blue aura over and very close to that incandescence. That aura is best observed by looking across the incandescent surface from a point on the side and close to the plane of the incandescence.

By treating the outer face of the matrix so that fiber ends project into the blue aura, those ends become somewhat more incandescent than the remainder of the matrix face. Having at least about 5 ends per square centimeter of gross matrix surface provides a detectable increase in infra-red radiation as compared to the total absence of projecting fibers. Further increases of the number of projecting fiber ends per square centimeter further increase the radiation, until the projecting fibers become so crowded together, less than ½ millimeter apart. At those densities the matrix face from which those incandescent ends project, shows a drop in incandescence.

Between the foregoing low density and the high density of the projecting fibers, it appears that those fibers are heated by the blue aura to a temperature higher than the temperature of the remainder of the matrix, without lowering the temperature of the remainder of the matrix.

A similar increase in efficiency is obtained by substituting any other heat-resistant material for the projecting fibers. Thus an 80-mesh screen of 5 mil nichrome wire can be fitted over the matrix and spaced about ⅛ inch from its outer face, so that the matrix and the screen wires become incandescent when the burner operates. The resulting radiation is more intense than is obtained with an ordinary matrix and without the screen, all other things being equal. Also the blue aura is no longer visible when the matrix carries the spaced screen. The radiation-boosting effect of metal screening is diminished when the screen wires are as thick as 15 or more mils. Non-metallic fibers can be as thick as about 20 mils before they begin to lose their boost effectiveness.

For some purposes it is desirable to operate matrix burners with their matrix faces at temperatures below the 1100° F. which is the normal lower limit, and with an efficiency greater than is possible from a matrix impregnated with a combustion catalyst such as platinum. In a burner operating with an ordinary ceramic fiber matrix, turning down the combustion mixture flow will lower the incandescence intensity until the incandescence corresponds to a color temperature of about 1100° F. Further flow reduction renders the burning unstable, causing localized flickering, and the blue aura becomes a flickering flame. When this happens the previously incandescent matrix surface has cooled to below 400° F. and the burner is not generating sufficient infra-red energy to be commercially useful.

According to the present invention commercial operation at color temperatures as low as 950° F. is provided by mounting about ½ inch from the outer face of the matrix a metal screen having a mesh from about 50 to about 100 wires per inch, with the wires about 3 to about 7 mils thick. Placing such a screen over the unsatisfactory flickering flame arrangement just described, stops the flickering, causes the matrix to return to a uniform incandescene, substantially eliminates the flame, and the screen wires become heated to a color temperature slightly lower than that of the matrix, as viewed from outside the screen. The net result is to efficiently provide infra-red radiation at an effective color temperature from 1100° F. down to about 950° F.

FIG. 5 shows such a screen-covered burner 130 which has a standard matrix 131 clamped to a burner body 132 provided with an encircling air-seal plenum channel 133. A series of metal hold-down angles 134 extending around the edges of the matrix are clamped down against those edges by a series of carriage bolts 135 whose enlarged heads 136 engage the upper faces of the angles and whose square shank portion 137 is fitted through a corresponding square punched-out hole in the angles. Each bolt also fits through aligned holes in the upper and lower webs 138, 139 of the air-seal channel, and is clamped down by a nut 140 threaded over the extending end of the bolt and threadedly tightened to compress the matrix edges.

In FIG. 5 the heads 136 of some of the carriage bolts are drilled and tapped to threadedly receive flat-head screws 141 that hold a guide plate 142 and a spacer frame 143 against the hold-down angles 134. The frame and guide plate extend around the periphery of the matrix, and over the guide plate is secured screen 144. The screen is shown as having one edge gripped in a folded and crimped metal securing strip 145 provided with an eyelet 146 resiliently secured to the burner body by coil spring 147. The other end of the spring is hooked around a support spot-welded to the body or fitted under nut 140. Two opposite edges of the screen 144 can be thus mounted, and if desired all four screen edges can be mounted this way. It is preferred however, for the screen to be a series of narrow strips held side by side by the illustrated mountings at one or both ends of each strip.

Frame 143 is preferably of felted ceramic fibers apertured at 148 to receive screws 141 and the heads 136 of the carriage bolts. In addition the lower surface of the frame can be relieved at 149 to better fit against the edge of the matrix. This relief provides a space 150 which can receive most or all of the air-seal air blown through the matrix from slot 151 in the air-seal plenum. Diverting this air away from the exposed outer face of the matrix 131 leaves that face in better condition for very low temperature operation. For this purpose space 150 opens to the ambient atmosphere at each frame corner as well as at any other desired location, such as through extra escape holes cut into the frame.

Screen 144 should have a mesh of from about 50 to about 100 wires per inch, with the wires from about 3 to about 7 mils thick. While a ½ inch spacing from the outer face of the matrix gives best results, the spacing of the screen can be as little as ¼ inch and as much as ¾ inch and still provide a stable effective color temperature below 1100° F. The screen can also be fitted to burners that have no air-seals, or to burners having air-seals that project out air streams which are not diverted away as they are in FIG. 5.

The low temperature operation and the operation with little or no blue aura at higher temperatures, are particularly desirable for generating infra-red energy with extremely small degrees of NOX emissions. Their CO emissions are also quite small and can be further reduced as by adjusting the combustion mixture to have up to about 20% excess air. They are thus highly suited for use indoors without chimneys or flues, to warm people or animals.

Burning a gaseous hydrocarbon fuel at the surface of a ceramic fiber matrix has been found to yield exceptionally small amounts of carbon monoxide and nitrogen oxides. Burners of this type are accordingly highly suited for industrial and domestic space heating by merely facing the incandescent matrix toward the space and the people to be warmed. The gaseous combustion products leaving the matrix can thus be permitted to enter and diffuse through the space being warmed, without increasing the carbon monoxide and nitrogen oxide content of the air in the space as much as it would be increased by open flames of conventional fuel-fired heaters or even cooking ranges. A matrix type space heater is accordingly very inexpensively installed. Since it is also a very effective generator of infra-red energy and warms both through such infra-red generation as well as by the heating effects of its hot combustion products, it also makes a highly efficient installation.

If desired such a space heater can be equipped with a hood that collects its combustion products as they rise from a laterally directed vertical matrix face, for example, and vents them through a chimney or stack. Inasmuch as matrix combustion is essentially stoichiometric there can be essentially no excess air in those combustion products so that the cross-sectional area of the stack or chimney can be quite small.

The infra-red heating of the present invention can be applied as the first or the last heat treatment stage of a wet web, or at any intermediate point in the drying of the web. Because the gas-fired burners have an exceedingly high power density and can be made of almost diminutive size, they can be readily fitted into compact spaces and retrofitted in many prior art types of dryers.

FIG. 6 shows a portion of a steam-roll type of dryer generally indicated at 300 with an infra-red generator of the present invention 310 positioned between two steam rolls 302, 303. Generator 310 can have an overall height of only about 14 inches or even less, and an overall width including a combustion mixture manifold 312, of about the same dimension.

Figure 7:
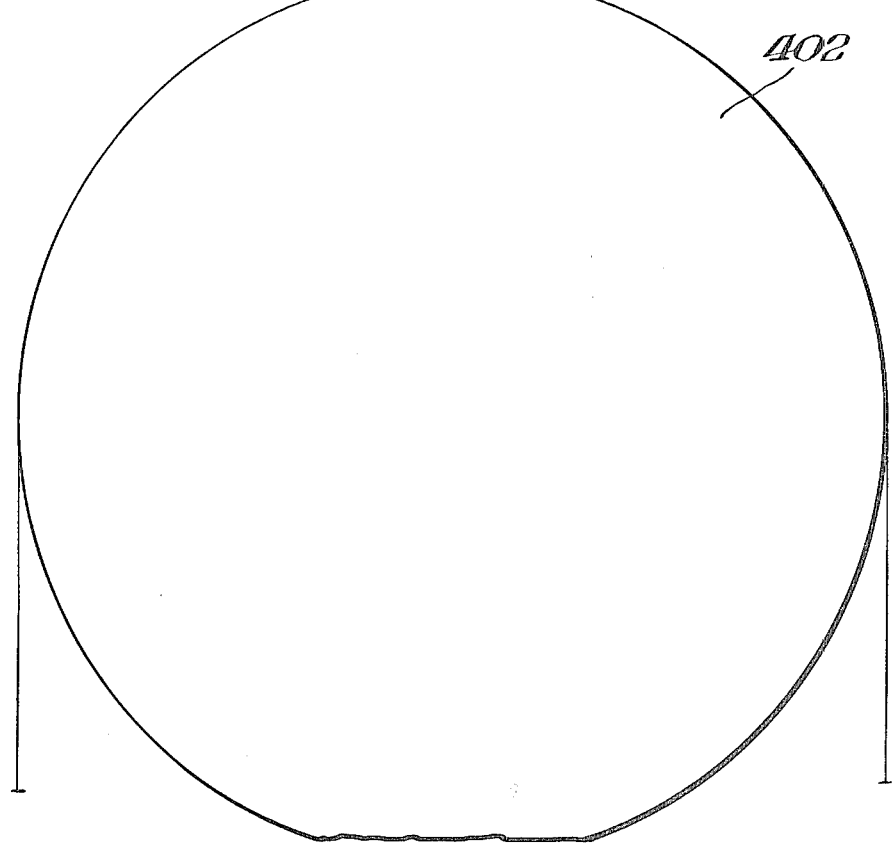
FIG. 7 is a vertical sectional view of another irradiating arrangement according to the present invention.

FIG. 7 shows a burner 410 according to the present invention placed opposite the curved face of a relatively large sized drying roll 402. Such a drying roll having a diameter of about 5 feet presents a curved outer surface which over a span of an 11 inch radiant burner face varies only about a half inch in its distance from that face. Such variation is of no real significance, even when the radiant face is positioned as close as 2 inches to the nearest portion of the roll surface. Indeed advantage can be taken of the roll's curvature by a fitting pilot light fixture 440 so that it is located in a position at which the roll surface is further away from the radiant face. Pilot flames can thus be kept a little further removed from the web being irradiated so that the risk of inadvertent scorching by the flame is reduced. This combination can also be used with the drying roll as small as about 2 feet in diameter.

Moreover the drying roll need not have the usual internal steam supply, so that it merely operates as a supporting or back-up roll that guides the web being irradiated around the cylindrical path illustrated. Alternatively steam can be supplied to the roll interior at a pressure below standard, as for instance when the roll has begun to deteriorate and will not safely hold the pressures for which it was designed.

It is also practical to build a matrix-type burner with its matrix bowed so as to follow the curvature of a roll opposite which it is mounted. Bowing of a matrix is easily done by manufacturing it in a curved mold, or where the bowing is relatively slight by merely bending it to fit into an appropriately shaped burner face. Where re-radiators are used they can be more readily bowed, or they can be fitted at an angle to the incandescent surface so as to follow the curvature of roll 402. A scoop as in FIG. 1 can be fitted to the leading edge of generator 310 or 410, or positioned to engage the web on the drying roll from which it approaches the generator.

The construction of generator 410 can be as more fully illustrated in FIG. 11 herein and in FIGS. 6 through 9 of U.S. Pat. No. 4,272,238. FIG. 8 also illustrates a desirable heating and drying combination of the present invention. Here a conveyor 160, which can be of the belt or vibratory type, carries a layer of particles that are to be dried and/or heated. The layer first passes under infra-red generator 170 which can have any of the gas-fired constructions described above or in the parent applications or can be of the ceramic tile or wire mesh type. After the infra-red generator, the particles pass under an array of tubes 161 through which there is projected downwardly, spaced streams of heated gas. This gas comes from a manifold 162 into which it is blown by a blower 163. The intake of the blower is connected to two hoods, one shown at 164 as extending along one side of burner 170 and manifold 162. The other hood extends similarly along the other side of those structures.

Hoods 164 suck up the hot combustion gases generated by burner 170, as well as the gases blown out of the bottoms of tubes 161 after those gases have blown through the layer of particles. These sucked up gases can then be further heated by a burner upstream or downstream of blower 163, and blown out against the layer of particles. However, if this blown out gas does not have to be as hot as, or hotter than, the hot combustion products from burner 170, little or no auxiliary heating is needed in the sucking and blowing section. Where the blown gases cool too much in that section, a second burner 170 can be added in front of the first burner so as to add more infra-red irradiation as well as extra heat for the blown gases.

It is not necessary to seal in the gas collection and recirculation path of the construction of FIG. 8. This simplifies the construction and the sucking in of a little extra air is no significant problem.

Tubes 161 can have their lower ends tightly or loosely fitted through holes in a horizontally-extending deflector plate. Alternatively a tube construction as in U.S. Pat. No. 4,235,591 can be used with or without the hot gas recycling of that patent. Even the blowing arrangement of U.S. Pat. No. 3,239,863, designed for dust removal, can be used to effectively blow heated gas over substrates to dry them.

Figure 9:
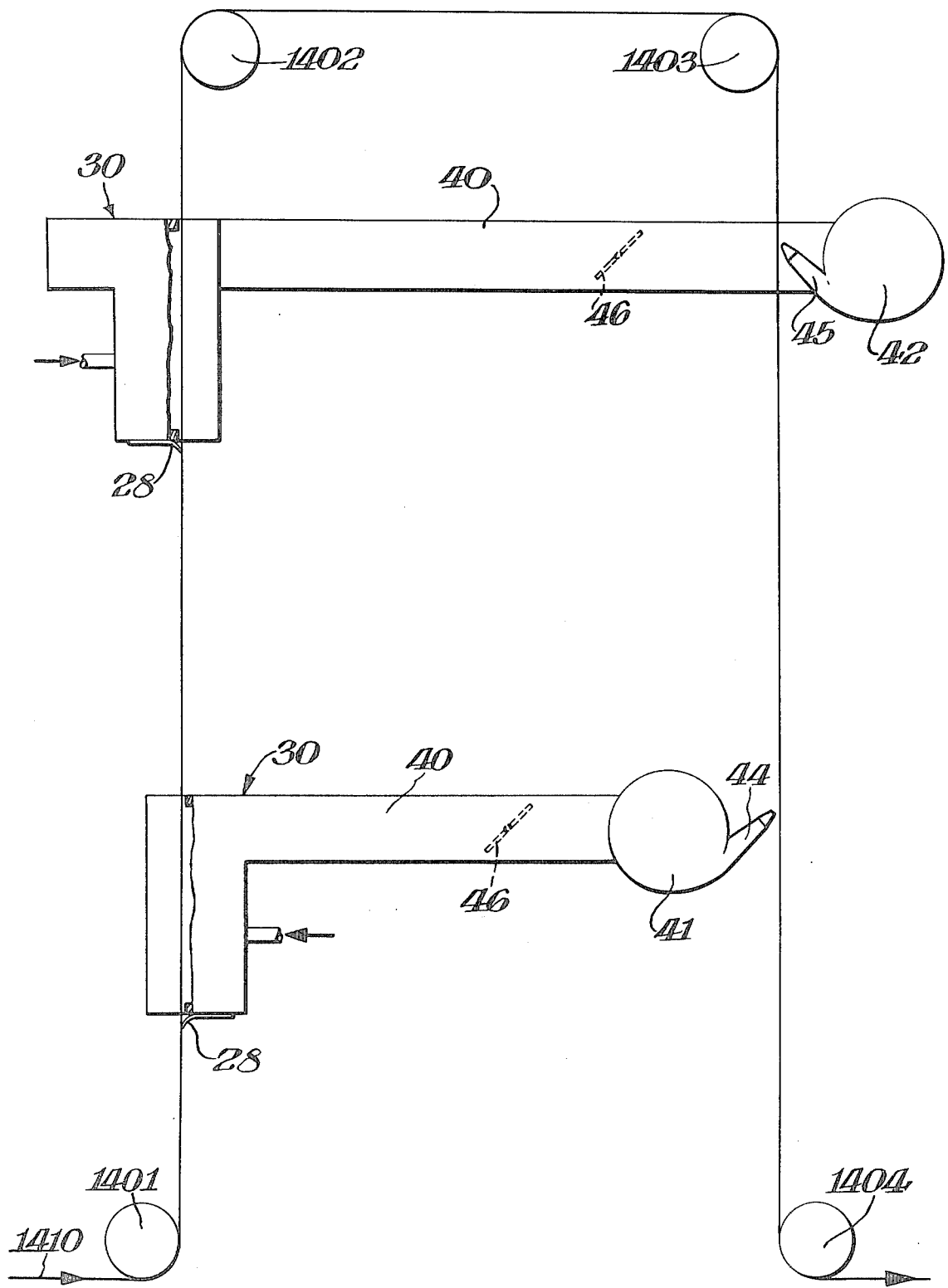
FIG. 9 is a schematic side view of yet another irradiating apparatus incorporating the present invention.

FIG. 9 illustrates a very effective pre-dryer of the present invention. This pre-dryer has four rolls 1401, 1402, 1403 and 1404 that guide a freshly dyed textile web 1410 to a set of stream-heated drying rolls (not illustrated) where the final drying is effected. Between rolls 1401 and 1402 the web moves upwardly and in this travel each of its faces is irradiated by a heater assembly 30 illustrated in FIG. 1. Each of these assemblies has a draw-off conduit 40 through which gaseous combustion products that are still quite hot, are withdrawn. These conduits 40 lead to the intakes of blowers 41, 42 which have their discharge outlets 44, 45 directed to rapidly below the discharged gases against the textile web as it descends between rolls 1403 and 1404.

The heater assemblies 30 can each have a scoop 28 that not only improves the drying action but also helps keep the web from fluttering as it moves upwardly. Such fluttering generally takes place, sometimes to a dangerous degree, in pre-dryers that have a substantial span between rollers 1401 and 1402.

The discharges of blowers 41 and 42 are preferably arranged to propel against the textile web, streams of hot gas at a velocity of at least about 10 linear feet per second. The velocity brings the hot streams in very good heat exchange relation with the web. The heat exchange relation is also improved by inclining the hot streams about 30 to about 60 degrees upwardly. An enclosure can be provided around the downwardly moving textile web to help confine the blown streams near that web as they move upwardly alongside it.

FIG. 9 also shows an adjustment device in the form of a damper 46 in conduit 40. This damper can be opened or closed to provide the optimum drying effect. Thus the re-radiator 26 of assembly 30 will supply the best heating when it is at the highest possible temperature, and damper 46 can be adjusted while the surface temperature of the re-radiator is measured with a pyrometer. Opening the damper too wide can increase the suction in the discharge plenum 35 so much as to draw ambient air in through the re-radiator and this will cool down the re-radiator surface. On the other hand closing the damper too much reduces the volume of hot gas blown through the pump outlet. Optimum drying is generally effected when the damper is as far open as it can be set and still keep the re-radiator surface very hot.

Only one drying assembly can be used in the apparatus of FIG. 9, or conversely a large number of them can be used so that little or no steam roll drying is needed.

As shown in FIG. 10 an infra-red radiating burner 1510 can have a Bernouilli airfoil floating dryer 1601 preceding it in the path through which web 1502 moves during the drying. Dryer 1601 is an elongated box that can be generally rectangular in cross-section and provided with a very narrow slot 1610 through which a stream of heated gas such as air is expelled at a velocity of ten to fourteen thousand linear feet per minute. The slot lips 1611, 1612 are shaped to divert the expelled stream at an acute angle, about 30 to 60 degrees away from the box wall 1613 that forms upstream lip 1612. At such stream velocities the stream moves along the surface of substrate 1502 and develops Bernouilli forces that urge the substrate toward, but also hold it short a fraction of an inch from wall 1613. This type of gas flow is rather turbulent and very effectively subjects the substrate to the drying action of that stream.

The gas stream for dryer 1601 is preferably taken from the hot combustion products discharged by burner 1510, as by enclosing the combined dryer structure in a housing into which all the hot gases flow, and from which a blower blows some of those gases into the interior of the box of dryer 1601.

Dryer 1601 is shown as directing its discharged stream counter-current to the movement of the substrate but can alternatively discharge its drying stream in the opposite direction so that it mover co-current with the substrate. Moreover, two or more such Bernouilli airfoil dryers can be fitted to the leading wall of burner 1510, and these can have their gas streams all directed counter-current, or all co-current, or some one way and the remainder the other.

Another Bernouilli airfoil dryer 1602 is shown as fitted to the exit end of dryer 1510 and can operate like the preceeding dryer or dryers 1601. Also, the re-radiator panel 1560 can be eliminated along with its mounting structure, so that the exit Bernouilli airfoil dryer 1608 directly follows irradiating burner 1510. The Bernouilli airfoil drying combination does not require the build-up of any significant depth of hot gases under the burner matrix or under the re-radiation panel, if used. Other Bernouilli type substrate floating constructions, such as in U.S. Pat. No. 4,247,993, can also be used.

The constructions of the present invention are particularly suited for heating material such as wet textile webs to dry dry them, or latex-coated carpet backs to dry and cure the latex, or paper or paperboard webs to dry them and/or cure coatings applied to them. Thus a single burner will dry and cure a 1/16 inch thick latex layer on a carpet back moving under the burner at the rate that gives the latex a five-second exposure with the burner face held at about 1400° F. 5 inches away. For drying wet textile fabrics such as used in clothing, the burners of the present invention can be used in a pre-drier to subject freshly dyed wet fabric to about 4 to 10 seconds of irradiation to matrix faces held at about 1450° F. This sets the dye and partially dries the wet fabric, the remainder of the drying being effected in any desired way, as for example by the standard steam-heat rollers or by burners having a matrix face temperature of about 1100° F.

It is generally desirable to have the burners located below the work being irradiated inasmuch as the burner body is then not subjected to so much heating and the rising hot combustion products remain longer in contact with the work, thus increasing the heating effect. In some cases however the only practical installation has the burner firing face down over the work and in such an arrangement advantage can be taken of the added downward heating effect of a trapped column of hot gaseous combustion products.

FIG. 11 shows an installation with such added downward heating effect. Burner 810 is mounted over a dryer roll 802, as in the construction of FIG. 7 but only about 3 feet in diameter, and around the roll a paper web 803 is carried past the downwardly-facing burner matrix 804. This matrix is shown as cemented in the mouth of an open-bottomed burner box 806, as in the construction of FIG. 1, and does not have an air seal. However it does have a small pilot light compartment defined by an internal partition 812 in the burner box. The pilot light compartment has a mouth 814 only about one to two square inches in cross-section, fed by a separate combustion mixture inlet 816. The combustion of the pilot combustion mixture at the outer face of matrix 804 can be used, along with the principal combustion over the balance of the matrix, for irradiating the paper 803, but because of the diminutive area of the pilot combustion its irradiation can be blocked as by a flame detector such as an ultraviolet sensor 818. Such blocking makes it impossible for the pilot irradiation to overheat the paper in the event the paper movement stops without interrupting the pilot flame. The principal combustion is stopped when the paper movement stops. A jet of cold air can be supplied as from nozzle 819 to help keep the flame detector from overheating.

It is also helpful, when the paper stops and the principal combustion also stops, to automatically turn down the pilot combustion to the minimum. This reduces the overall heat output and gas consumption during such stoppage, but is not really needed unless barrier 818 is omitted. Pilot compartment partition 812 can alternatively be omitted along with the pilot combustion mixture supply and barrier 818, so that the electrical ignition directly ignites the main combustion mixture.

Barrier 818 is shown as carried by a ceramic fiber board 821, which with three other such boards, two of which are shown at 822 and 823, are clamped around the side walls of the burner box, as by a strap 830. Board 821 can have a slot into which barrier block 818 is fitted.

A set of ignition electrodes 832 can also be carried by board 821 and held against the outer face of the pilot light portion of the matrix, to electrically ignite the pilot combustion mixture. The ignition electrodes can also include a combustion-proving electrode as in FIG. 8 of U.S. Pat. No. 4,157,155, but if desired combustion can be verified as by an ultra-violet detector that looks up at the edge of the incandescent matrix surface where it extends beyond an end of the dryer roll.

Boards 821 etc. form a compartment 840 about two inches high, and in the compartment the hot gaseous products of combustion build up until they spill out and up over the lower edges of the boards. Such build-up increases the heating effect on the paper 803. Even a one-inch high compartment gives a measurable improvement, but compartment heights greater than about 3 inches are not preferred.

Boards 821 and 823 are shown as not extending downwardly as far as the remaining compartment-forming boards, and as fitted with wings 851, 852 also of thermal insulation. The wings are carried by supports 850 that are clamped to the burner, and have the function described in U.S. Pat. No. 4,272,238.

When used without the wings, the compartment-forming boards can be impervious to gas, or they can be quite pervious, as the matrix is, or they can have any other degree of perviousness so long as the hot combustion gases leak through the boards at a rate lower than the rate these gases are delivered to the compartment through the matrix 804.

While the boards 821 etc. are shown as vertically positioned, they can be flared out in the downward direction, or they can be partly vertical and partly flared. The flared configuration need not have added wings, inasmuch as the flare gives about the same effect as the wings and can extend as far.

The leading edge 829 of board 823, can be positioned very close to the paper web 803, so as to act like a scoop. It is preferred that there be sufficient spacing, at least about 10 mils, between the two to assure that the moving paper does not wear away that edge. If desired burner 810 can be of the air-seal type instead of the non-air-seal type.

The construction of FIG. 12 is used to help dry one or both edges of a paper web. When paper dryers are fed with undryed paper wider than preferred, the outermost few inches of the edges 912 of the paper generally do not dry sufficiently. According to the present invention narrow burners 900 are placed over and/or under one or both edges 912 to more closely equalize the drying in such an installation.

In FIG. 12 two burners 900 are shown as held on an outer carry plate 902 that is pivoted from overhead pin 904 by means of an elongated beam 906, so that the burners can be pivotally retracted from the illustrated position, to simplify the threading of the paper web 910 through the drier. The burners are easily restored to their illustrative operative position where they are latched in place.

The fuel supply conduits to the burners 900 are made flexible to yield with the foregoing pivotal action or the conduits can be provided with swivel joints, the swivel axes of which are aligned with pin 904, so that the portions of the conduits secured to the burners can pivot with the burners. Where the burners have air-seal margins, a blower can be mounted on one of the burners 900 or on carry plate 902 or beam 906, to supply a stream of air for the air-seals, and if desired all the air for the combustion mixtures as well.

Carry plate 902 is also shown as holding a pad 916 of thermal insulation such as one made of felted ceramic fibers. This pad is not needed, but if used improves the drying efficiency by acting as an absorber and re-radiator of infra-red rays. It absorbs infra-red radiation emanating from the faces of burners 900 and its surface 918 becomes quite hot in doing so. This hot surface re-radiates infra-red energy to the surfaces of paper edge 912 without losing much heat by conduction to the relatively cool carry plate 902. Pad 916 can be grooved as shown at 922 to permit the paper edge to completely block direct radiation from one burner face to the other.

Passageways 931, 932 can be provided through the carry plate 902 and through the pad 916, so that the faces of the burners can be observed and thus monitored to assure proper operation. Automatic monitoring can be arranged by fitting a light or ultraviolet sensor to the passageways, and connecting them to automatically shut off all fuel flow to a burner whenever the burner face is not lit. For lighting the burners electric ignition such as shown in U.S. Pat. No. 4,157,155 can be used, or if desired pilot flames, with manual controls to override the sensors.

Groove 922 can be flared to better permit radiation to reach the extreme margin of the paper. Burners 900 can also be equipped with scoops and/or extensive re-radiator panels as in Ser. No. 186,491 and/or confining boards such as 822 and 823.

Where two burners 900 are used at one edge of the paper, they can be located face-to-face, or they can be offset so that they do not radiate directly at each other in the event the paper web 910 tears or its edge 912 is damaged or missing. Such direct counter-radiation can rapidly damage the burner faces, particularly if those faces are ceramic fiber mats, and to guard against such damage a photoelectric web edge detector can be located upstream from the burners and connected to shut off the flow of fuel to one or both burners when the edge 912 is missing from the paper web.

A similar safeguard can be used to extinguish both burners when the paper web 910 stops or slows down excessively. Even relatively low-temperature operation of the burners can rapidly scorch a stopped paper web.

Either or both burners 900 can also be equipped with re-radiator panels. Where so equipped the assembly of one burner with its re-radiators can be placed directly opposite a similar second assembly but with each burner directly facing the re-radiator panel portion of the opposing assembly.

FIG. 13 illustrates the manufacture of corrugated board 1010 from a corrugated core sheet 1012, a lower face sheet 1014, and an upper face sheet 1016. Corrugating rollers 1041, 1042 corrugate the core sheet 1012 where these rollers mesh, and roller 1041 carries the corrugated sheet past an applicator roll 1046 that applies adhesive to the lower edge of each corrugation. Roller 1041 also presses the thus coated core sheet against the lower face sheet 1014 which is supported by a backing roller 1051.

Face sheet 1014 with the corrugated core sheet adhered to it moves to the right as shown in this figure, carrying the top of the core sheet past a second applicator roll 1047 which applies adhesive to the top edge of each corrugation. This assembly then is covered by the top face sheet 1016 introduced against the adhesive-coated corrugation as much as the lower face sheet is pressed at roller 1051, so that the adhesion of the top sheet is best reinforced by the application of heat.

To this end a burner 1000 is shown as held above the face sheet just down stream of roller 1060, firing downwardly onto the face sheet. Only a few seconds exposure to such heating will set the top face adhesive. Heating can similarly be provided for the lower face sheet if desired. Also the freshly assembled sheets can be gripped by continuous conveyor belts pressing against one or both face sheets to more securely keep the sheets pressed as they advance to the heater and are withdrwn from it.

Burner 1000 is shown as provided with an electrically lit gas pilot light 1074 more fully illustrated in Ser. No. 94,901, but it can also be equipped with re-radiation and/or confining boards as in FIG. 11. It is also helpful to have an additional burner heating the lower face of the assembled corrugated board, as well as further burners preheating the lower face of sheet 1016 as well as the upper face of sheet 1014 just before these sheets reach the feed positions shown in FIG. 13.

A burner 1000 may alternatively or additionally be positioned between applicator roll 1046 and corrugated roll 1041 thus permitting the direct radiant heating of core 1012 as well as causing the hot combustion gases to be trapped vetween core 1012 and liner board 1014. A similar irradiation of the upper face of core 1012 can be provided between applicator roll 1047 and corrugator roll 1041.

The infra-red energy radiated by ceramic mat burners has a very high power density. It can for example cure a polymerizable silicone coating with as little as 5 seconds of radiation. It is also very effective for drying wet webs of paper or the like without the help of any steam-heated rolls.

Figure 14:
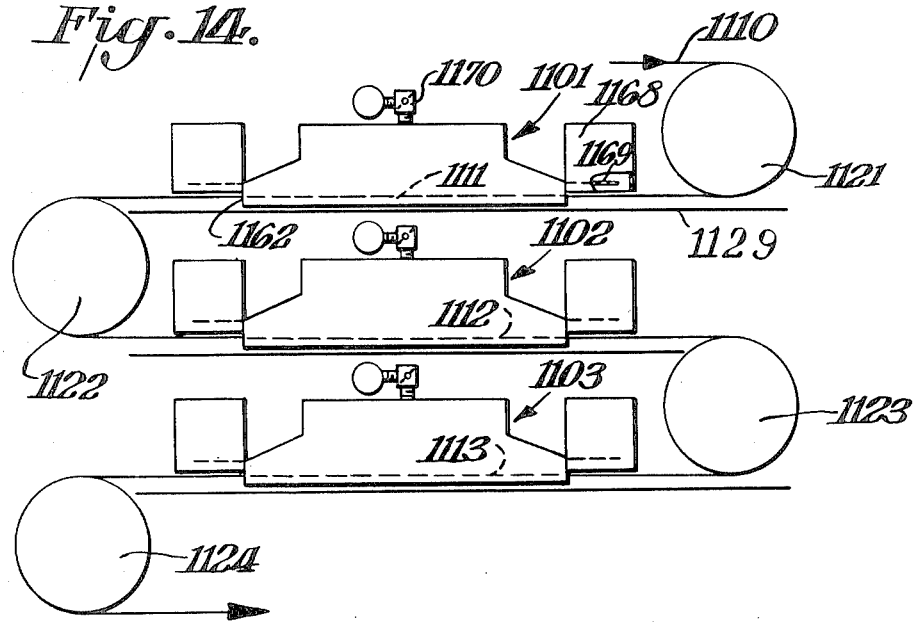

The apparatus of FIG. 14 has a series of rows of downwardly-facing burners, three rows of which are shown at 1101, 1102 and 1103. A web of wet paper 1110 makes a series of passes at 1111, 1112 and 1113 below the faces of the burners, with the help of reversing rolls 1121, 1122, 1123 and 1124. The paper can then be wound up, or if further drying is needed can be exposed to additional burners or looped over steam cans or other drying equipment. If desired all or some of the reversing rolls 1121, 1124 can be internally heated as by steam or other fluid, to make the drying apparatus more compact.

Figure 15:
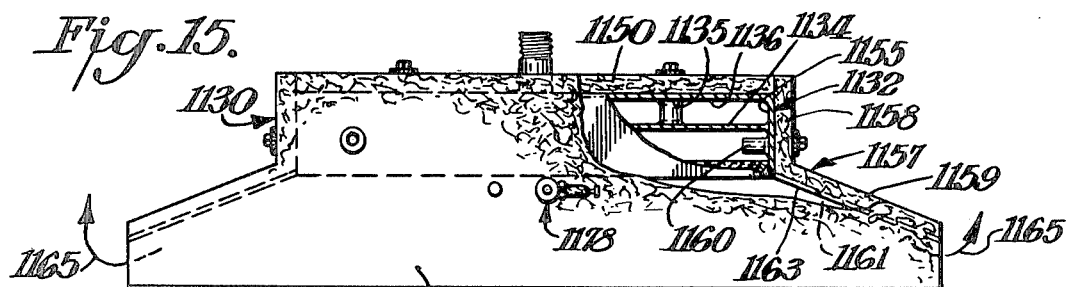
FIG. 15 is a partly broken away detail view of a burner of the construction of FIG. 14.

Each row of burners has a set of relatively small side-by-side individual burners 1130. As shown in FIG. 15, each burner 1130 has a generally rectangular metal body 1132 of metal like aluminum that conducts heat very well, and with a wall thickness of about ⅛ inch so that it is thick enough to effectively conduct away excessive heat. In FIG. 15 the burner has a combustion mixture deflector plate 1134 supported by posts 1135 secured to the plate and to the back wall 1136 of the burner body. The burner body, plate, and posts are preferably brazed together, as by the molten flux dip brazing technique referred to in Ser. No. 94,901.

A single insulation block or pad 1150 can cover the backs of an entire row of burners, if desired, or can cover a single back or any other number of adjacent backs.

Figure 16:
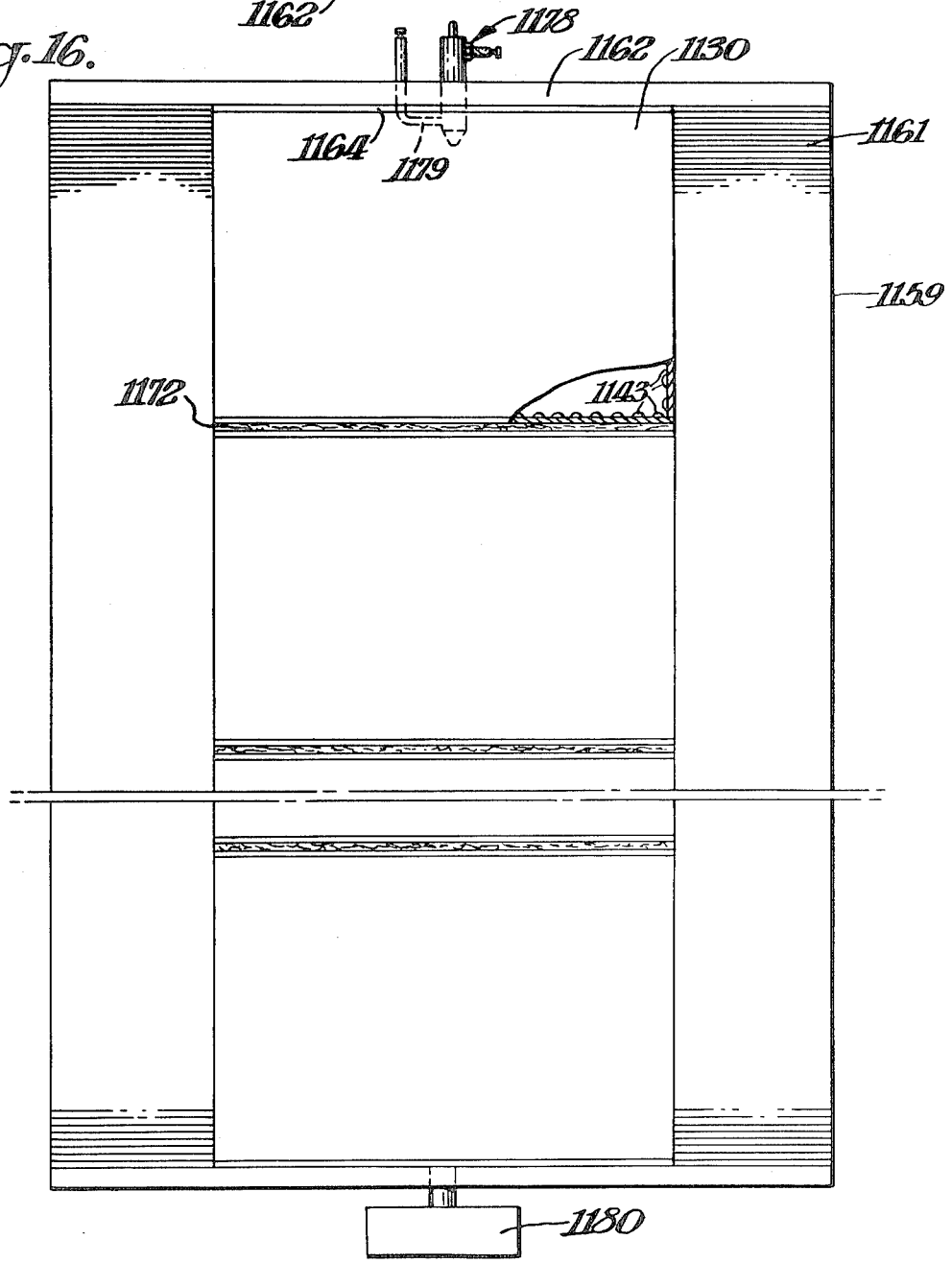
FIG. 16 is a bottom view of a burner assembly in the construction of FIG. 14.

The burner sides 1155 that are aligned to make the leading and trailing burner edges across which the paper 1110 moves, are shown in FIGS. 15 and 16 as fitted with insulation blocks 1157 that are molded into angularly related flanges 1158 and 1159. Flanges 1158 are clamped against sides 1155 with the help of posts 1160 similar to posts 1135 that are only secured to the burner side walls. Insulation flanges 1159 flare outwardly from the burner faces, preferably at an angle of about 60 to 80 degrees from the vertical. The lower face 1163 of these flaring flanges can have its surface area effectively increased as by a succession of adjacent grooves 1161. The width of flanges 1159 is preferably from about ⅓ to about ½ the width of the burners, in order to take full advantage of the heating effects of the hot combustion gases discharging from the burner faces when the burners are operating.

As shown in FIGS. 14, 15 and 16, the hot combustion gases are kept by thermal deflectors 1162 from escaping over the free edges of the burner walls 1164 at the ends of each row. Deflectors 1162 can be mounted to walls 1164 the same way blocks 1157 are mounted, but the deflectors preferably extend downwardly lower than the bottom edges of blocks 1157, to a level below the path of the paper 1110. The hot combustion gases rise and will accordingly flow upwardly around the bottom edges of blocks 1157, as shown by arrows 1165.

FIG. 14 also shows exhaust ducts 1168 that collect the hot combustion gases which can then be used as a heat source for other operations or to pass through rolls 1121-1124 to heat them. Ducts 1168 can be provided with baffles 1169 that direct the hot gases over a few more inches of the paper 1110 before those gases are withdrawn.

Each individual burner of a row can have its own feed trimming valve 1170 that can be adjusted to offset uneven heating effects that may be caused by differences in the porosities of the matrix faces of adjacent burners. The burners in each row can be mounted with their adjacent sides in direct contact, but preferably a compressible pad 1172 of thermally resistant material such as ceramic fibers is fitted between adjacent burners as in FIG. 6. Such a pad about ⅜ inch thick compressed to half that thickness does not make too much of a gap in the incandescent surface defined by the burner faces, and it also helps to keep the burner-to-burner joints plugged against the leakage of hot combustion gases as a result of thermal expansion during operation.

The gaps between individual burners of a row can have their radiation interrupting effects reduced by shaping the burners so that these gaps extend at an angle with respect to the direction of paper movement. This will spread the radiation interrupting effect over wider portions of the paper, or even over the entire width of the paper.

The radiation interruption at the gaps is also reduced by a tapered thickness reduction at the free edges of the burner side walls, as shown in FIG. 25 of Ser. No. 238,418. The burner matrixes 1176 are sufficiently resilient that they can be squeezed into place against such tapered walls and thus effectively reduce the width of the outer lip of the wall to about 1/16 inch even though the balance of the wall is about ⅛ inch thick.

As pointed out above, the movement of the hot combustion gases over the flared surfaces 1163 heats up those surfaces to temperatures that come close to the temperature of the incandescent burner faces, particularly when those surfaces are of low density thermal insulation. The resulting high temperature of surfaces 1163 will accordingly generate additional infra-red radiation that helps dry the paper 1110. This additional drying is provided without increasing the amount of fuel used, so that the fuel efficiency is greatly improved.

FIGS. 15 and 16 further show the provision of a burner igniter in the form of a spark-fired pilot flame director 1178 as in FIG. 13. This can be provided with its own flame-detecting rod 1179, or if desired an ultra-violet detector 1180 can be fitted at the opposite end of a row of burners, to detect burner operation when the burners are being lit, and automatically shut down the gas feed if the burners do not ignite or if they should be inadvertently extinguished.

Figure 17:
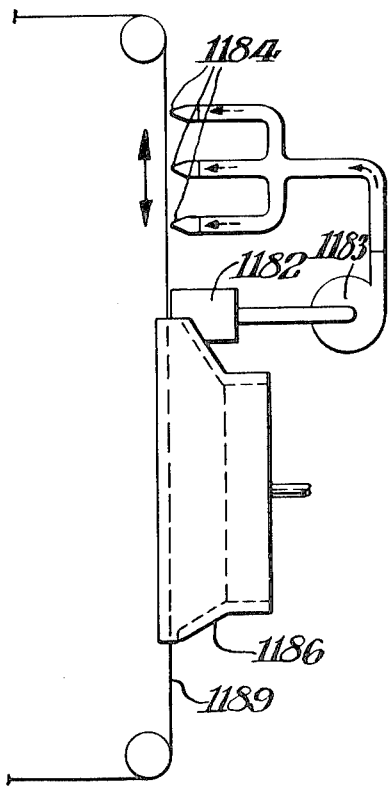
FIG. 17 is a partly schematic side view of an additional irradiating arrangement typical of the present invention.

FIG. 17 illustrates a modified arrangement used to heat paper or other webs that are moving vertically rather than horizontally. In such an orientation the hot combustion gases need not flow downwardly out of the bottom edges 1186 of the burner units, so that those edges can be relatively short lengths of insulation that are horizontal or only mildly flared—about 20 to 30 degrees down from the horizontal. Those lower edges can also be brought relatively close to the moving web 1189—about ½ inch—to limit the ingress of ambient relatively cool air into the hot combustion gases.

To improve the heating effect of the hot combustion gases they are withdrawn through a top exhaust duct 1182 and propelled by a blower 1183 to jets 1184 from which those hot gases are jetted against the moving web 1189. This breaks up the boundary layer barrier of steam or the like that can be present on the web.

The burners of the present invention dry paper with particular effectiveness. The radiation they emit is about as efficient in removing the last bit of excess water from an almost bone-dry paper, as it is in removing the first bit of water from a very moist sheet, and this permits an unexpectedly sharp drop in the bulk of a paper dryer.

However textile webs of cotton, wool, polyester, rayon, polypropylene, dacron and the like, or mixtures of such fibers, as well as plastic films are also very efficiently dried or cured with such burners.

A guide, such as plate 1129 in FIG. 14, can be used to assist with the threading of web 1110 past the burners in preparation for a drying run.

The grooving 1161 preferably has a depth of at least about ⅛ inch, and this depth can be as much ½ inch. The grooving effectively increases the surface 1161 as compared to a perfectly flat surface, and an increase of at least about 50% is desired. To this end the profile of the grooves can be triangular, rectangular, sinusoidal, or have any other shape.

The combustion gases discharging from the far ends of the surface 1191 can still be sufficiently hot to warrant their use as for heating a further radiating surface. Thus those gases can be sucked through a porous insulator such as a ceramic fiber matrix positioned as an outer extension of surfaces 1161. The resulting relatively forceful flow of still hot gas through the porous matrix heates it up more effectively than the surface 1161 is heated, so that the heated face of the porous ceramic fiber matrix can contribute a significant amount of additional infrared radiation.

The use of the surfaces such as 1161, with or without the foregoing extensions improves the operation of any fuel-fired burner that generates hot combustion gases. Thus burners 1130 can be replaced by ceramic tile burners, metal screen burners, or ceramic cup type burners, or even direct flame burners, and in each case the burner operation shows a similar improvement.

FIG. 18 shows a particularly effective heating arrangement for heat treatment of a moving web such as in textile drying and curing or paper processing or curing coatings on webs or wires. The illustrated construction is a modification of the construction of FIG. 22 in parent application Ser. No. 186,491 with the parts similarly numbered, and can be constructed in a similar manner. The description in that application is hereby incorporated herein as though fully set forth.

A key modification in FIG. 18 is the use of the apparatus for curing coatings on wires. A horizontal row of freshly coated parallel wire strands 1501 is passed below the incandescent face 1503 of the burner 1510 as well as below the face 1520 of re-radiator panel 1560. Also a supplemental re-radiating panel 1505 is mounted below the wires 1501, by securing it between the skirts 1519 of depending side panels 1546.

Panels 1550 and 1505, as well as skirt faces 1516 can be of the same ceramic fiber re-radiator construction forming an almost complete enclosure around the wires 1501. Such an arrangement provides highly efficient wire heating inasmuch as the radiant energy created at burner face 1503 reverberates throughout the enclosure with essentially the only escape at the relatively shallow apertures 1511, 1513 through which the wires enter and leave. Some of that energy is also absorbed by the wires and their coatings, so that making the apertures 1511, 1513 smaller increases the efficiency of the heat transfer to the wires and their coatings, and decreases the rate heat is required to be generated at burner face 1503.

Reducing the surface area of the walls bounding the reverberation compartment also decreases the loss of heat through those walls and likewise decreases the rate of required heat generation.

According to the present invention the reverberation compartment preferably has its walls not more than about 1 inch from the wires, and extends longitudinally of the wires a distance no more than about twice the longitudinal span of burner face 1503. With such an arrangement there is no need to make the apertures 1511, 1513 any smaller than the cross-section of the reverberation compartment, although for best efficiency those apertures can have half that cross-section, or less. Panel 1505 can be made readily removable if it is desired to simplify the threading of the wires through the reverberation compartment. To this end panel 1505 can be held in place by metal clips 1509 snapped over the top of the apparatus.

As described in Ser. No. 186,491, the hot combustion gases emitted from burner face 1503 are carried over through re-radiator panel 1560, which is porous, and drawn off at outlet 1572. This action helps heat up surface 1520 and thus increase its re-radiation effectiveness.

The construction of FIG. 18 can be operated upside down so that the burner face 1503 faces upwardly, and in such an arrangement the sucking of the hot combustion gases through panel 1560, or through any other panel is ordinarily not needed. Those hot gases can be merely permitted to flow out the ends of the reverberation compartment. However the sucking action does help increase the temperature of the face of the panel through which the sucking takes place. Moreover when the wires have coatings that give off noxious gases such as vaporized coating solvent, the sucking action can be used to collect those gases and in this way better control their disposal.

Additionally many gases so evolved are combustible and can be made to burn on the surface 1520 through which they are sucked, to thus further increase the heating and curing effectiveness of the apparatus of the present invention, and at the same time reduce its environmental impact. A coating of platinum black particles can be applied to surface 1520 as by spraying it with a solution of chlorplatinic acid and then heating the sprayed surface to a temperature that decomposes the chlorplatinic acid. Catalyst weights of as much as one to two grams per square foot of gross surface (as measured with a ruler) can be used. Other platinum family metals and oxidation catalysts can be substituted for the platinum. Cerium oxide and the oxides of other rare earth metals are examples of good oxidation catalysts.

The catalytic combustion feature can be used without the reverberating compartment, as for example when heat treating webs of coated carpeting or other gas-generating materials that are essentially opaque to the radiation with which they are treated.

It is noted that the catalytic combustion of vapors generally calls for the presence of significant quantities of oxygen in the vapor-carrying gases. Burner 1510 is of the air-seal type through which a curtain of air is discharged from plenum 1512, and the rate of such discharge can be controlled to assure the presence of sufficient air in the gas stream sucked through panel 1560.

Some air can be introduced from the surrounding atmosphere, particularly where no reverberation compartment is used, so that the air-seal air may not be needed to supply all the oxygen for the catalytic combustion.

Whether or not air is needed for addition to the hot combustion gases, burner 1510 can be replaced by one that is not of the air-seal type. Additional air can be entrained in the gaseous mixture burned on the surface of 1540 in the form of excess air. As much as 50% excess air could be entrained without seriously affecting total efficiency.

The reverberating compartment feature of the present invention is particularly suited for irradiating substrates too open or transparent to effectively absorb an impinging irradiating beam having a substantial cross-sectional area. Woven screening or highly transparent plastic webs are further examples of such substrates.

Infra-red radiation is also highly effective for pre-heating plastic sheets to prepare them for pressure or suction forming, or for stretching. Thus a continuous sheet of polystyrene or the like can be moved in steps toward a cutting and molding press that stamps out successive suitably dimensioned portions and successively molds them into shape, with the sheet subjected to any of the irradiation arrangements described above immediately before it reaches the cutting and molding press. By making the irradiation zone equal in sheet travel length to length of each sheet advancing step, uniform pre-heating of the sheet is obtained.

Where it is necessary to limit the amount of pre-heating so that an incandescent radiator surface must be substantially smaller than the length of an advancing step, the advancing sheet can be arranged to first advance at an uninterrupted uniform rate past a short irradiation zone, and to then be carried as by a tenter frame assembly that permits stepwise feeding to the cutting and molding press.

In the event the pre-heating tends to cause the plastic sheet to shrink in width or length, the heated sheet can be placed under tension, transversely or longitudinally or both. To this end a tenter frame type step advancing means can be provided with weighting rolls to apply longitudinal tension to loops of the sheet, and can additionally or alternatively be fitted with clamps that grip the side edges of the sheet and in this way apply transverse tension. A similar arrangement can be used for deliberately stretching a plastic film, or tensilizing fibers. Plastics that are transparent to visible light are generally good absorbers of infra-red radiation so that they heat up very rapidly when irradiated with any of the burners described herein.

A feature of the present invention is the efficient use of the hot gaseous combustion products of gas-fired infra-red irradiators to assist with the irradiation. Thus those still hot gases, with or without the addition of ambient or recirculated air can be forcibly directed to the substrate to effect mass transfer and/or additional heating or drying. Some or all of the hot gases can be routed through a gas-to-gas or gas-to-liquid heat exchanger to recover their heat energy for use in different connections.

Where a substrate being irradiated gives off vapors or dust or the like, and the hot combustion gases travel along the substrate before these gases are led away for reuse, it is sometimes helpful to leave unrecovered a laminar stratum of the gases at the substrate. This helps limit the contamination of the reused gases and the plugging of reuse passageways in heat exchangers or the like. The reused hot gases, or other gases heated by the hot gases, can be directed through nozzles or jet tubes, or through airfoil-type supports, to either or both faces of a substrate.

Obviously many modifications and variations of the present invention are possible in the light of the above teachings. It is therefore to be understood that within the scope of the appended claims the invention may be practiced otherwise than as specifically described.

What is claimed:

1. An apparatus for heat treating elongated wires by infra-red radiation, said apparatus having a gas-fired infra-red generating panel with a surface of extended area on which the gas is combusted to cause that surface to become incandescent, a reverberation compartment fitted about that surface and defining with it a treatment tunnel extending as a continuation of the panel but no longer than about twice the length of the generating surface, through which tunnel a set of the elongated wires is passed to receive the heat treatment, the walls of the compartment including the wall facing the incandescent surface being essentially entirely passive thermally insulating material that is readily heated to elevated temperatures by the infra-red radiation from the incandescent surface and then re-radiates the radiation back into the tunnel so that essentially the only way for the radiation to escape is through the inlet and outlet of the tunnel compartment, the walls of the compartment being no more than about one inch from the wires, and the inlet and outlet having cross-sections no greater than half the cross-section of the compartment.

2. The method of heat treating elongated wires by subjecting them to infra-red irradiation, which method is characterized by passing a row of spaced wires through an infra-red reverberation tunnel whose walls are essentially entirely passive thermal insulation and are fitted about as well as face a panel having an extended infra-red generating surface on which gas is burned to heat that surface to incandescence, the tunnel having a length of not more than twice the length of that surface with an inlet for the wires at one end and an outlet for the wires at the other end, the walls of the tunnel being not over about 1 inch from the wires, and the inlet and outlet of the tunnel having cross-sections not over about half that of the tunnel.

3. The apparatus of claim 1 in which the infra-red generating surface faces downwardly, the downwardly facing compartment wall alongside that surface is porous, and suction means is connected to the exterior of that porous wall to suck through its thickness hot combusted gas generated by the combustion at the incandescent surface.

* * * * *